US012026949B2

United States Patent
Pundak et al.

(10) Patent No.: US 12,026,949 B2
(45) Date of Patent: Jul. 2, 2024

(54) ACCESSORY PAIRING BASED ON CAPTURED IMAGE

(71) Applicant: Microsoft Technology Licensing, LLC, Redmond, WA (US)

(72) Inventors: Gilad Pundak, Rehovot (IL); Eran Arbel, Netanya (IL); Nadav Linenberg, Even Yehuda (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 18/073,466

(22) Filed: Dec. 1, 2022

(65) Prior Publication Data

US 2024/0185606 A1 Jun. 6, 2024

(51) Int. Cl.
| | |
|---|---|
| *H04L 29/06* | (2006.01) |
| *G06F 3/0354* | (2013.01) |
| *G06F 3/044* | (2006.01) |
| *G06F 3/0482* | (2013.01) |
| *G06T 7/50* | (2017.01) |
| *G06V 20/50* | (2022.01) |
| *G06V 40/10* | (2022.01) |
| *H04M 1/725* | (2021.01) |
| *H04R 3/00* | (2006.01) |

(52) U.S. Cl.
CPC .......... *G06V 20/50* (2022.01); *G06F 3/03545* (2013.01); *G06F 3/0442* (2019.05); *G06F 3/0482* (2013.01); *G06T 7/50* (2017.01); *G06V 40/107* (2022.01); *H04R 3/00* (2013.01); *H04R 2420/07* (2013.01)

(58) Field of Classification Search
CPC ........ G06V 20/50; G06V 40/107; G06T 7/50; G06F 3/0442; G06F 3/03545; G06F 3/0482; H04R 3/00; H04R 2420/07
See application file for complete search history.

(56) References Cited

U.S. PATENT DOCUMENTS

| | | | |
|---|---|---|---|
| 9,667,764 B1 | 5/2017 | Kuhl et al. | |
| 10,707,912 B2 | 7/2020 | Kim et al. | |
| 10,965,859 B2 | 3/2021 | Lei | |
| 2015/0133051 A1 | 5/2015 | Jamal-Syed | |
| 2015/0256391 A1 | 9/2015 | Hardy | |

(Continued)

FOREIGN PATENT DOCUMENTS

CN 108683800 B 4/2021

OTHER PUBLICATIONS

"Connect your AirPods and AirPods Pro to your iPhone", Retrieved from: https://support.apple.com/en-in/HT207010, Sep. 22, 2022, 2 Pages.

(Continued)

*Primary Examiner* — Deeprose Subedi

(74) *Attorney, Agent, or Firm* — Alleman Hall & Tuttle LLP

(57) ABSTRACT

A method for electronic accessory pairing includes capturing an image of an external environment via a camera communicatively coupled to a host computing device. The image of the external environment is analyzed to detect presence of an imaged electronic accessory. After determining that the host computing device is not presently paired with the imaged electronic accessory, a pairing is established between the host computing device and the imaged electronic accessory.

19 Claims, 10 Drawing Sheets

(56) References Cited

U.S. PATENT DOCUMENTS

2015/0327309 A1    11/2015  Gärdenfors
2020/0358769 A1*   11/2020  Belov ................... H04W 12/71

OTHER PUBLICATIONS

Invitation to Pay Additional Fees received for PCT Application No. PCT/US2023/035474, Jan. 19, 2024, 12 pages.
International Search Report and Written Opinion received for PCT Application No. PCT/US2023/035474, Mar. 13, 2024, 21 pages.

\* cited by examiner

ACCESSORY PAIRING BASED ON CAPTURED IMAGE

BACKGROUND

Many computing devices can be wirelessly paired with a wide variety of different accessory devices, such as styluses, audio output devices (e.g., headphones, earbuds, speakers), mice, keyboards, etc. Device pairing often involves interacting with one or more on-screen menus displayed by the computing device, and/or interacting with physical controls on the accessory to initiate a pairing process.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The present application is generally directed to pairing a computing device with a separate electronic accessory based at least in part on an image captured by a camera. Specifically, the camera is used to capture an image of an external environment, which is then analyzed to detect presence of an electronic accessory. After determining that the accessory and the computing device are not currently paired, a pairing is established between the computing device and the accessory.

DETAILED DESCRIPTION

Figure 1B:
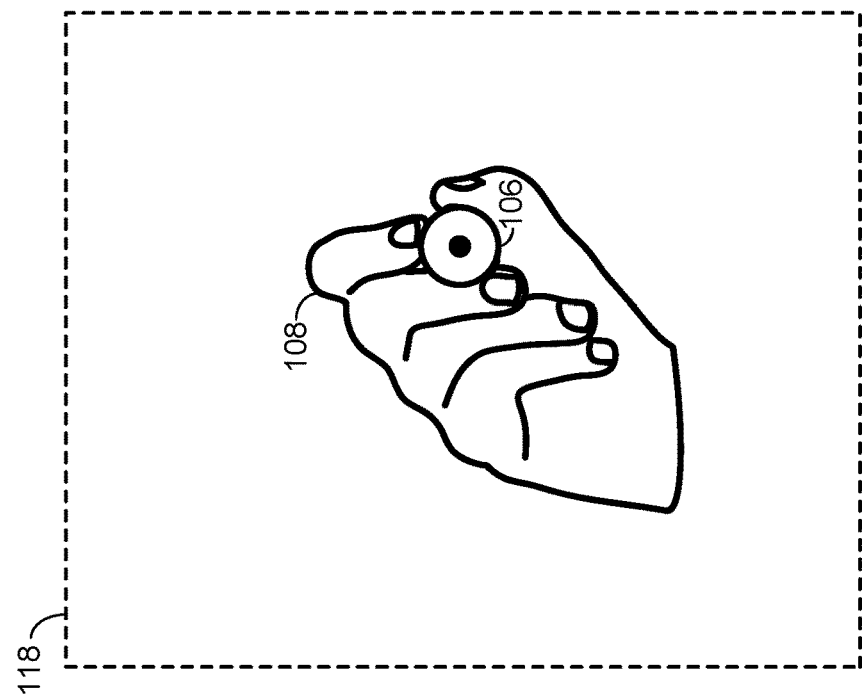
FIGS. 1A and 1B schematically illustrate an example host computing device and separate electronic accessory.

It is generally desirable to improve the speed and consistency of wirelessly pairing a computing device with a separate electronic accessory. As used herein, "pairing" generally refers to establishing a bidirectional communications channel between two devices over which data can be exchanged in the future. In some examples, this communications channel is implemented via transmission and reception of radiofrequency (RF) signals according to a suitable communication protocol, such as Bluetooth®.

Such pairing can be difficult in many common scenarios. For example, a user may attempt to pair a new stylus with their computing device while working in an environment where a number of other accessories are present—e.g., the user is in an open office with several coworkers, each using their own styluses and headphones. It is likely that many if not all such accessories are detected by the user's computing device as being potentially available for pairing, e.g., via RF signals emitted by the accessories. Thus, as the user is attempting to pair their stylus, the user's computing device presents a list of detected accessories, in which it is difficult for the user to distinguish their intended stylus from the various accessories used by other people nearby. Furthermore, should the user inadvertently select the wrong accessory from the list (e.g., a similar stylus in use by someone else), errors, delays, and other undesirable outcomes can arise.

As another example, the pairing process between a computing device and accessory can sometimes be made faster through use of a "loose coupling." This involves the computing device and accessory transmitting and/or receiving some amount of data via a communications modality that is different from, and often shorter-range than, the RF communications channel used for full pairing (e.g., Bluetooth®). This can beneficially improve the speed of pairing and eliminate the need for the user to interact with physical mechanisms (e.g., a pairing button) on the accessory, enabling at least limited functionality of the electronic accessory before the full RF pairing process is complete.

For instance, a loose coupling can in some cases be established between an active stylus and touch-sensitive display device by driving an electrode of the stylus with an encoded drive signal, thereby changing electrical conditions in the vicinity of the stylus electrode in a manner that is detectable at the touch-sensitive display (e.g., as changes in capacitance). However, the performance of such loose coupling can be inconsistent in some situations—e.g., contact between a user's hand and the touch-sensitive display can sometimes create parasitic capacitances that interfere with detection of the stylus's drive signal. Similarly, in other examples, loose coupling is achieved via detection of an audio signal output by the accessory. However, sources of background noise can make it difficult for the computing device to detect the audio signal and initiate loose coupling with the accessory.

Accordingly, the present disclosure is directed to techniques for establishing a pairing between a host computing device and a separate electronic accessory based at least in part on an image of an external environment captured by a camera. Specifically, the image of the external environment is analyzed to detect presence of the electronic accessory—e.g., via a suitable previously-trained computer vision algorithm. A pairing is then established between the accessory and the computing device upon determining that no such pairing already exists.

Use of the image of the external environment improves the speed and/or consistency of the pairing process in various situations. For example, when presenting a list of detected accessories for potential pairing, the computing device in some cases filters the list to include only those accessories visible in the captured image, and/or estimated to be within a threshold distance of the host computing device. This can, for instance, reduce the risk that the user attempts to pair with an incorrect accessory that is detectable nearby, although is not visible to the camera. Similarly, should the user attempt to pair with an accessory that is not detected in the image of the external environment, the computing device in some cases outputs an indication of a potentially incorrect pairing and asks the user to confirm their selection.

Additionally, or alternatively, use of the image of the external environment can improve the accuracy of the loose coupling process described above. For instance, in a case where a user is touching the display surface with their hand while attempting to write with a stylus, parasitic capacitances between the hand and the touch-sensitive display can interfere with detection of the stylus's drive signal. As such, the signal-to-noise ratio of the signals detected at the host computing device in some cases is too low to detect presence of the stylus using only the conditions detected at the touch sensor—e.g., the computing device outputs a confidence value for accessory presence that falls below a positive detection threshold. However, capturing an image of the external environment enables visual detection of the electronic accessory, enabling the loose coupling to be established despite the relatively weaker signals detected at the touch sensor. It will be understood that the example of a stylus pairing with a touch-sensitive display is non-limiting, and that the herein-described techniques are applicable to other types of accessories and other loose coupling scenarios.

The techniques described herein thereby provide the technical benefits of improving human computer interaction, and reducing the burden of user input to a computing device, by facilitating faster, easier, and more accurate pairing between the computing device and a separate accessory. In particular, the techniques described herein improve such pairing even when environmental conditions would make such pairing more difficult—e.g., due to presence of other accessories in the same environment, and/or poor detection of signals used to initiate a loose coupling process.

Figure 1A:
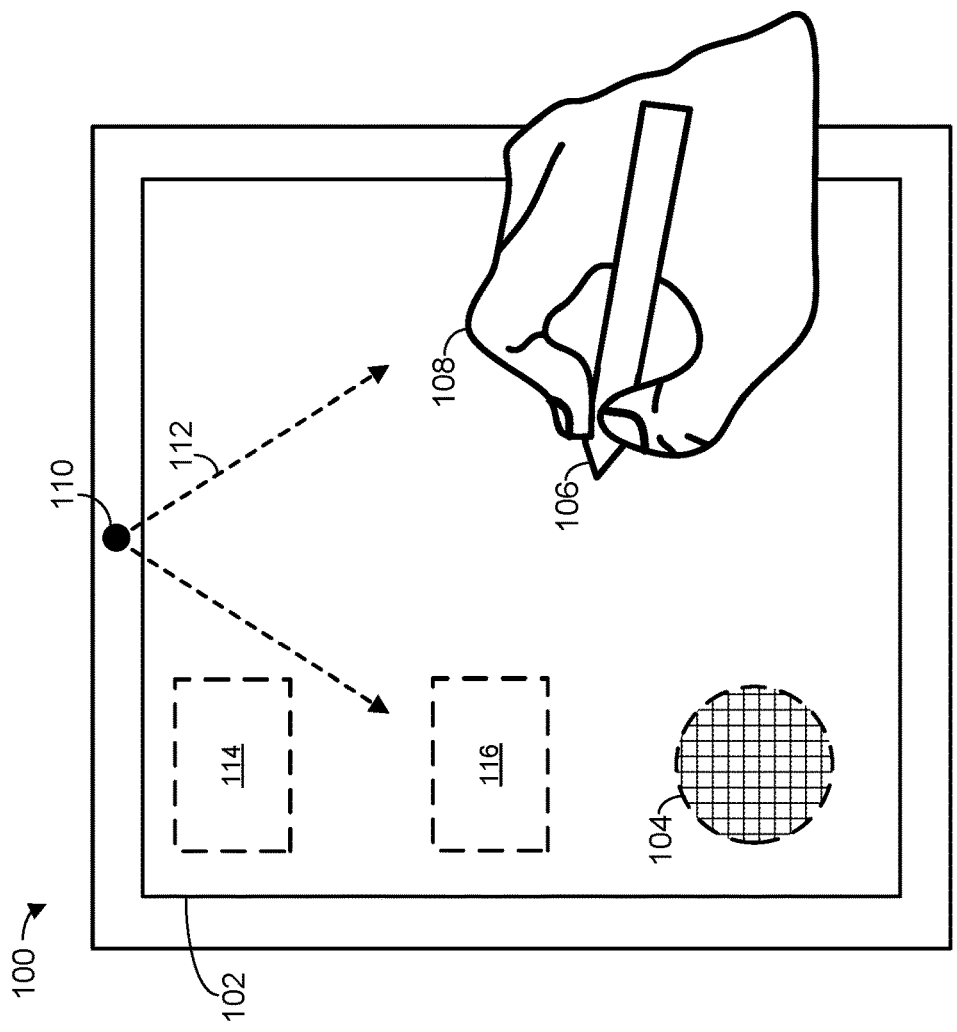

FIG. 1A schematically shows an example host computing device 100. As used herein, a "host" computing device refers to any suitable computing device having any hardware configuration, form factor, and capabilities, that can be paired with one or more separate electronic accessories. Examples of suitable host computing devices include smartphones, tablets, laptops, desktop computers, media center devices, audiobook readers, mixed reality devices, vehicle computers, etc. In some examples, computing device 100 is implemented as computing system 700 described below with respect to FIG. 7.

In the example of FIG. 1A, computing device 100 takes the form of a portable computing device including a touch-sensitive display 102. The touch-sensitive display comprises a plurality of touch electrodes 104 used to detect contact or proximity between the touch sensitive display and nearby input objects, such as styluses or fingers. The touch electrodes 104 are shown in dashed lines to indicate that they are disposed beneath the display surface and would not be visible from the illustrated perspective.

It will be understood that the touch-sensitive display has any suitable size, shape, and dimensions with respect to the rest of the computing device. The touch-sensitive display uses any suitable image-forming technology to present imagery (e.g., emissive and/or transmissive pixel technologies), and uses any suitable touch-sensing technology for detecting proximity of input objects (e.g., mutual capacitance, self-capacitance). In some examples, the computing device has more than one touch-sensitive display (e.g., arranged in a movable or foldable configuration relative to one another). In some examples, a computing device as described herein includes one or more displays that are not touch-sensitive. Alternatively, in some examples, the host computing device has no display componentry, touch-sensitive or otherwise.

In FIG. 1A, an electronic accessory 106 is proximate to the host computing device, and is shown being held by a human hand 108. In this example, the electronic accessory takes the form of a stylus, although this is non-limiting. In other examples, a host computing device is pairable with any of a wide variety of different suitable accessories, such as styluses, audio output devices (e.g., headphones, earbuds, wireless speakers), computer mice, keyboards, cameras, smartwatches, etc. An "electronic accessory" as described herein is implemented in some examples as computing system 700 described below with respect to FIG. 7.

Pairing between the accessory 106 and the host computing device 100 is done based at least in part on an image of an external environment captured by a camera communicatively coupled with the host computing device. In FIG. 1A, host computing device 100 has an integrated camera 110, having a field-of-view (FOV) indicated by lines 112 extending away from the camera. In various examples, any suitable camera is used, having any suitable resolution and FOV. In some examples, the camera is a visible-light camera. Additionally, or alternatively, the camera is sensitive to other wavelengths of electromagnetic radiation, such as infrared light. In the example of FIG. 1A, the camera is integrated into the computing device, although it will be understood that this is non-limiting. In other examples, the computing device is communicatively coupled to one or more external cameras—e.g., over a suitable wired or wireless connection.

In some examples, the camera operates in an "always-online" mode, and continuously captures images of the external environment whenever the host computing device is in an active state. Such an active state occurs, as examples, while the device is powered on, when a user is logged into the device, or when a user has provided input to the device within a threshold window of time (e.g., five minutes). Use of an "always on" camera beneficially reduces the burden of user input to the computing device by improving the accessory detection process without requiring the user to manually activate the camera.

In other examples, the camera is dynamically turned on and off in response to any suitable criteria. For instance, the camera is dynamically turned on whenever potential presence of a pairable accessory is detected, such by detecting a change in capacitance consistent with proximity of a stylus to a touch-sensitive display, detecting an audio signal consistent with a nearby accessory, or detecting RF signals emitted by an accessory in the external environment. In some examples, the camera is off by default, and is only turned on or activated in an "always online" mode in response to explicit user consent.

As will be described in more detail below, the images of the external environment are in some cases analyzed by an accessory detection controller. Host computing device 100 includes an accessory detection controller 114, also shown in dashed lines to indicate that it is disposed within the device and therefore would not be visible from the illustrated perspective. In some examples, the accessory detection controller is separate from a logic subsystem 116 of the host computing device. For instance, the accessory detection controller is a relatively low-power device used specifically for analyzing captured images to detect electronic accessories, while the logic subsystem is used for general purpose computing functions. Thus, in one example scenario, the accessory detection controller continuously analyzes images captured by an "always on" camera to detect presence of electronic accessories in the external environment, while the logic subsystem is used to perform other computing functions of the host computing device—e.g., running software applications.

In some cases, upon analyzing an image and detecting presence of an accessory (e.g., outputting a confidence value for accessory detection that exceeds a positive detection threshold), the accessory detection controller outputs an indication of accessory detection to the logic subsystem. In some scenarios, only the accessory detection controller receives the actual captured images, keeping such images isolated from the rest of the computing device, and thereby beneficially preserving user privacy. In other examples, however, it may be desirable for the logic subsystem to receive any or all captured images of the external environment. For instance, an image in which an accessory has been detected may be output to the logic subsystem for further analysis and/or display.

Both the accessory detection controller and the logic subsystem are implemented via any suitable computer logic componentry—e.g., processors or application-specific integrated circuits (ASICs). In some examples, either or both of the accessory detection controller and logic subsystem are implemented as logic subsystem 702 described below with respect to FIG. 7. Though the present disclosure primarily describes the accessory detection controller and logic subsystem as being separate, in some cases the functions described as being performed by the accessory detection controller and logic subsystem are instead merged into a single logic component, or distributed between more than two different logic components.

FIG. 1B shows an example image 118 of the external environment captured by camera 110. As shown, image 118 depicts stylus 106 held in close proximity to the host computing device by human hand 108. Analysis of image 118 enables detection of stylus 106 by the host computing device as an imaged electronic accessory. As will be described in more detail below, a pairing is established between the host computing device and stylus 106 based at least in part on image 118 captured by camera 110. Though only one image is shown in FIG. 1B, it will be understood that any suitable number of images of the external environment can be captured by any suitable number of cameras. Furthermore, although image 118 only depicts one imaged electronic accessory, it will be understood that any suitable number of different imaged electronic accessories may be detected in a single image.

Figure 2:
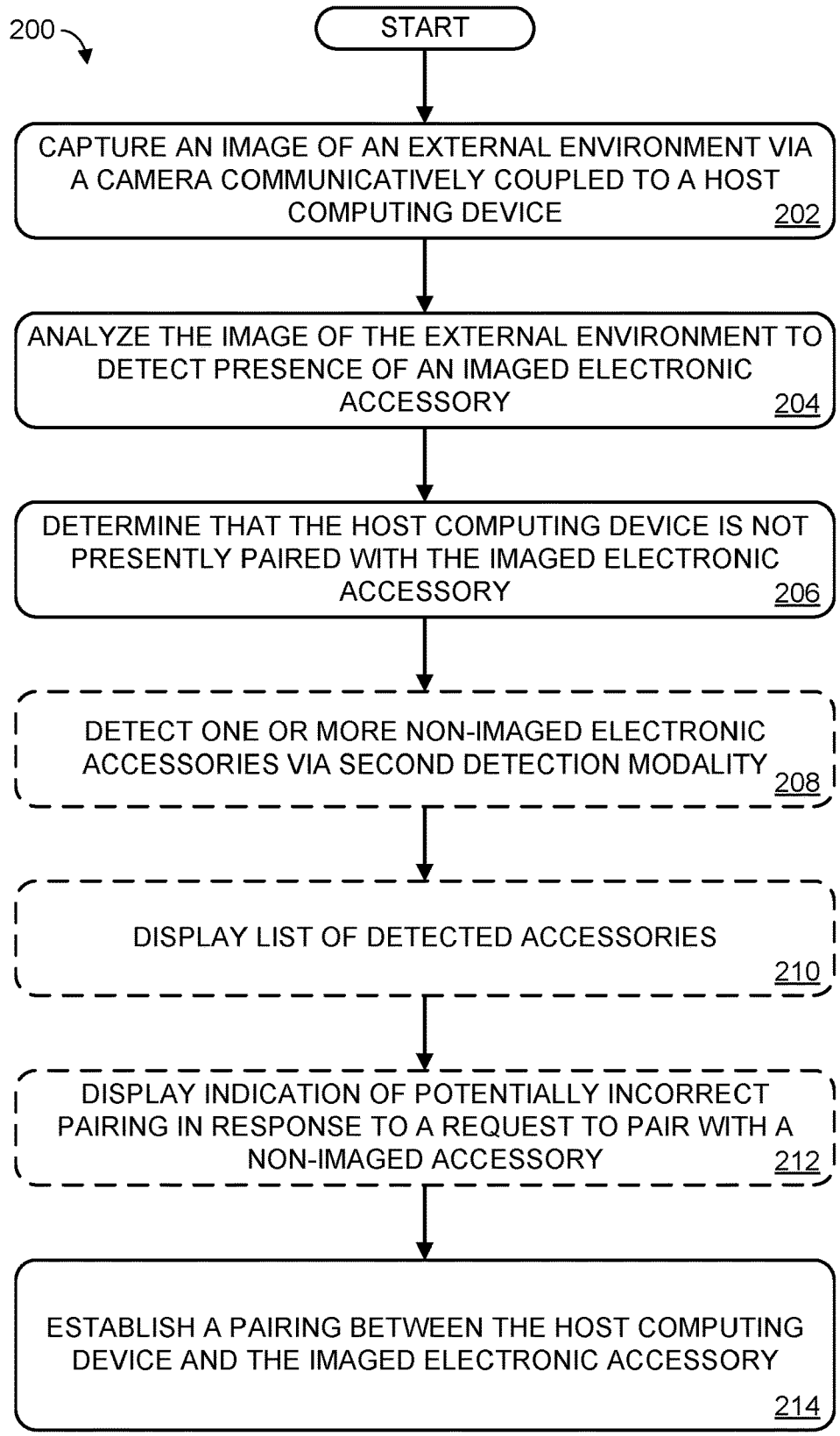
FIG. 2 illustrates an example method for electronic accessory pairing.

FIG. 2 illustrates an example method 200 for electronic accessory pairing. Method 200 is performed by any suitable computing system of one or more computing devices, each having any suitable capabilities, hardware configuration, and form factor. Steps of method 200 may be repeated and/or looped at any time and in response to any suitable condition. In some examples, method 200 is performed by computing system 700 described below with respect to FIG. 7.

At 202, method 200 includes capturing an image of an external environment via a camera communicatively coupled to a host computing device. In some examples, this is done substantially as described above with respect to FIGS. 1A and 1B. For instance, in some examples, the camera is on by default and is used to capture a plurality of images of the external environment while the host computing device is in an active state. As discussed above, an "active state" can refer to any time the computing device is powered on, whenever a user is logged in, whenever the computing device has received user input within a threshold window of time (e.g., the last five minutes), and/or any other suitable context depending on the implementation. Furthermore, the host computing device is communicatively coupled to any suitable number of integrated and/or external cameras, each of which has any suitable capabilities.

Figure 3:
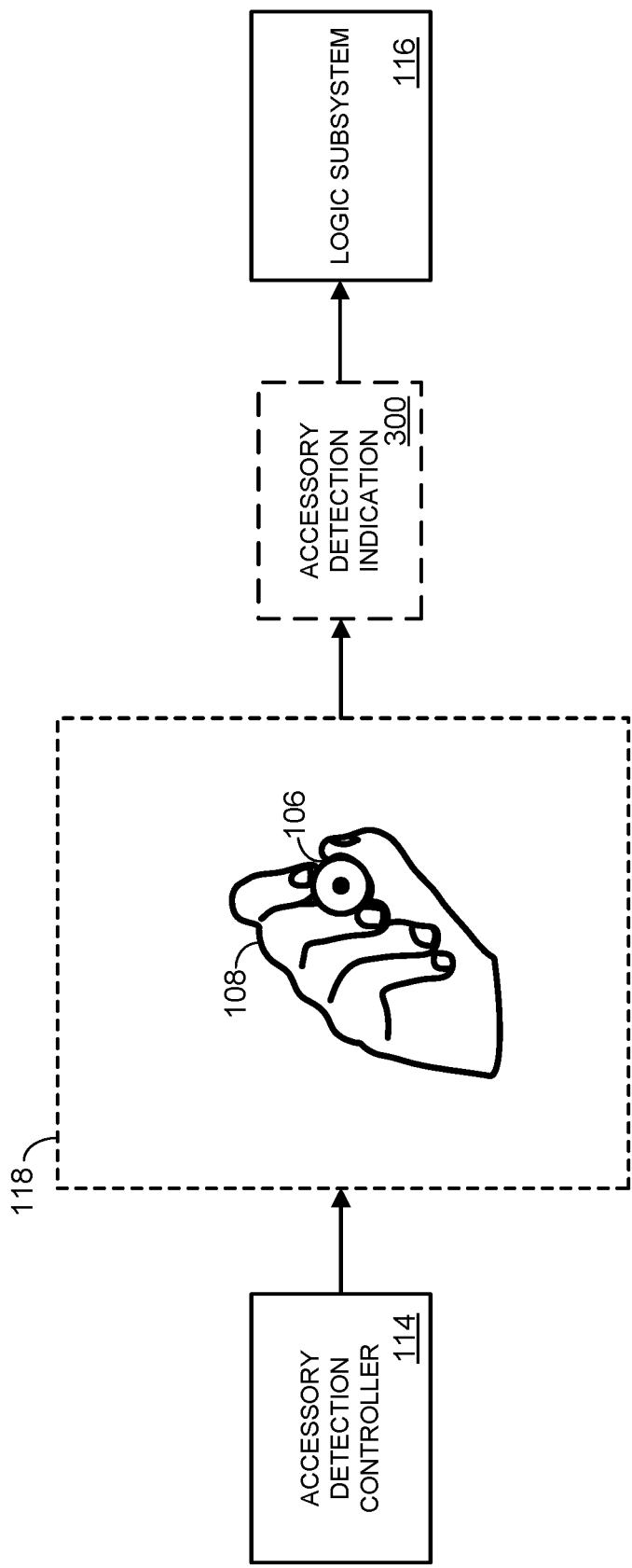
FIG. 3 schematically illustrates an accessory detection controller outputting an indication of detection of an electronic accessory.

At 204, method 200 includes analyzing the image of the external environment to detect presence of an imaged electronic accessory. This is schematically illustrated with respect to FIG. 3. Specifically, FIG. 3 schematically represents accessory detection controller 114 processing image 118 to detect presence of stylus 106. It will be understood that the accessory detection controller analyzes any suitable number of images—e.g., in some cases, the controller analyzes a plurality of images captured over time.

The accessory detection controller detects presence of the imaged electronic accessory in the captured image in any suitable way. In some cases, the accessory detection controller makes use of suitable computer vision algorithms, artificial intelligence (AI), and/or machine learning (ML) techniques to detect the accessory. For instance, as one example, a set of labeled training images are used to train a machine-learning classifier to detect different specific types of electronic accessories—e.g., to classify one or more distinct groups of pixels within a detected image as corresponding to one or more different detected accessories. In some cases, the analysis of the captured image results in an output confidence value of accessory detection, which can be used as one input in a downstream accessory detection process, as will be described in more detail below. In this manner, the system is beneficially expandable to detect more accessories by retraining the classifier with updated training images. Additional examples of suitable ML and/or AI techniques useable to provide the functionality described herein will be given below with respect to FIG. 7.

Additionally, or alternatively, the accessory detection controller detects the electronic accessory in the image in another suitable way. For instance, in some examples, the accessory itself features distinctive markers or indicators that are visible in the captured image. Such indicators can include markings that are printed, painted, or etched into the accessory (e.g., a barcode or QR code), and/or one or more indicator lights that emit visible and/or non-visible wavelengths of electromagnetic radiation. In some examples, such indicators are unique to particular models of electronic accessory, and/or unique to each individual accessory—e.g., a marking on a stylus encodes the model number and a unique identifier for the stylus. Thus, in some non-limiting examples, the accessory detection controller detects presence of the imaged electronic accessory by detecting presence of suitable markers in the image of the external environment.

As discussed above, upon detecting the imaged electronic accessory in the image of the external environment, the accessory detection controller in some cases outputs an indication of accessory detection. In FIG. 3, the accessory detection controller outputs an indication 300 of accessory detection to logic subsystem 116 of the host computing device. Such an indication takes any suitable predefined form, and includes any suitable information regarding the imaged electronic accessory. For instance, the indication may specify a general type of the electronic accessory (e.g., stylus, headphones, computer mouse), a specific make/model of the electronic accessory (e.g., expressed as a model name or serial number), a unique identifier of the electronic accessory, a location within the image at which the electronic accessory is detected (e.g., in pixel-space coordinates), an estimated size of the electronic accessory within the image, an estimated distance between the host computing device and accessory, and whether the accessory is in a use-ready context. As will be described in more detail below, a "use-ready context" refers to an evaluation of whether the accessory is imaged in a context in which it is likely to be used in the near future.

Returning briefly to FIG. 2, at 206, method 200 includes determining that the host computing device is not presently paired with the imaged electronic accessory. This is done in any suitable way, depending on the granularity with which the imaged electronic accessory is identified. For instance, in cases where the imaged electronic accessory has a unique identifier that is inferred from the image of the external environment, the host computing device checks whether a pairing already exists with an accessory having that specific identifier. This can occur when, for example, the electronic accessory has a unique appearance, and/or includes a marker (such as a barcode or indicator light) that conveys the accessory's unique identifier.

In other examples, the host computing device checks whether it is already paired with an electronic accessory having the same type or belonging to the same category as the imaged electronic accessory. For instance, the accessory detection controller outputs an indication of an estimated model of the imaged electronic accessory (e.g., a particular type of stylus made by a specific manufacturer), and the host computing device checks to see whether it is already paired with an accessory of the same model type. Additionally, or alternatively, the accessory detection controller outputs an indication of a general type of the imaged electronic accessory (e.g., a stylus, headphones), and the host computing device checks to see whether it is already paired with an accessory of the same type. For instance, in the case of relatively small computing devices (such as smartphones), it may be relatively unlikely for more than one stylus to be paired with the host computing device.

However, depending on the implementation and use-case scenario, situations may arise in which a user intends to pair multiple accessories of the same type and/or model with their host computing device. Thus, in some examples, the determination as to whether the imaged electronic accessory is already paired with the host computing device is biased toward determining that the imaged electronic accessory is not paired, absent relatively strong evidence indicating otherwise. Such evidence can include, for instance, inferring a unique identifier of the electronic accessory from the image, and determining that the host computing device is already paired with an accessory having the same unique identifier. By contrast, in some examples, it is relatively easy to determine that the host computing device is not paired with the imaged electronic accessory—e.g., the accessory is determined to be a stylus, and the host computing device is not already paired with a stylus-type accessory.

Continuing with method 200, at 208, the method optionally includes detecting one or more non-imaged electronic accessories via a second detection modality. In other words, the host computing device uses some method besides the camera (the first detection modality) to detect one or more electronic accessories that are in the external environment, although not visible in the captured image. In some examples, the second detection modality includes detecting RF signals emitted by the non-imaged electronic accessories via a suitable RF receiver of the host computing device. As additional non-limiting examples, the second detection modality includes detecting audio signals emitted by the non-imaged electronic accessories via a microphone of the host computing device, or detecting changes in local electrical conditions at touch-sensitive electrodes of the host computing device.

This is schematically illustrated with respect to FIGS. 4A-4E. Specifically, FIG. 4A again schematically shows host computing device 100 and stylus 106. Stylus 106 is visible within the FOV 112 of camera 110, and is thereby detected by the host computing device as an imaged electronic accessory. Furthermore, additional accessories 400 and 402 are present in the external environment. Accessory 400 takes the form of another stylus, and accessory 402 takes the form of a pair of headphones. Accessories 400 and 402 are not present within the FOV of camera 110 and thus will not be visible in an image captured by camera 110 in the illustrated scenario. However, accessories 400 and 402 are nonetheless detectable to the host computing device as non-imaged electronic accessories—e.g., via RF signals, capacitive signals, and/or audio signals emitted by the non-imaged accessories.

Returning briefly to FIG. 2, at 210, method 200 optionally includes displaying a list of detected accessories. In other words, prior to establishing the pairing, the host computing device in some cases displays a list of two or more detected electronic accessories for pairing, where the list includes one or more non-imaged electronic accessories detected via a second accessory detection modality of the host computing device and not detected in the image of the external environment. Furthermore, in some cases, the list is sorted such that the imaged electronic accessory is prioritized higher in the list than the one or more non-imaged electronic accessories. Additionally, or alternatively, the imaged electronic accessory is emphasized in the list in some other way—e.g., by adding a marker or icon next to the imaged electronic accessory to indicate that it is visible in the image.

Figure 4A:
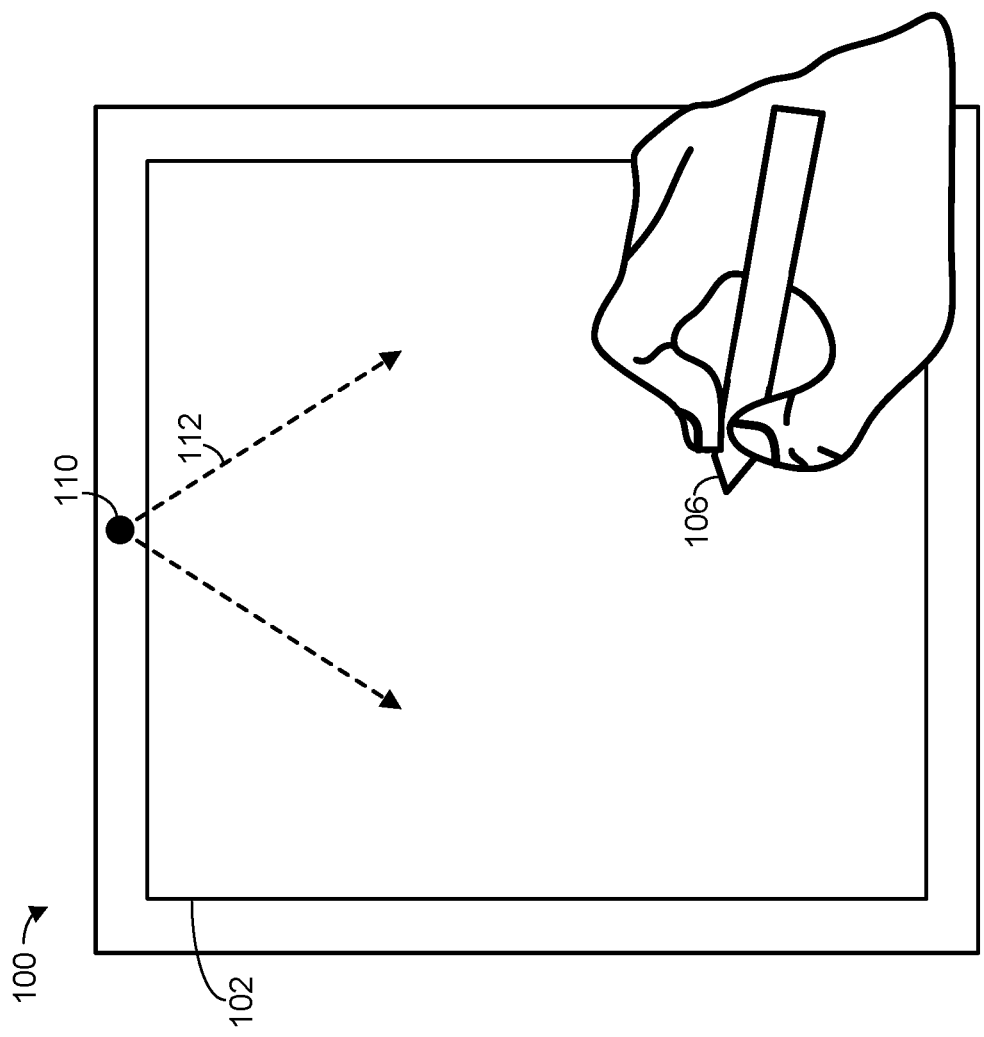
FIGS. 4A-4E schematically illustrate different electronic accessory pairing scenarios.
Figure 4A:
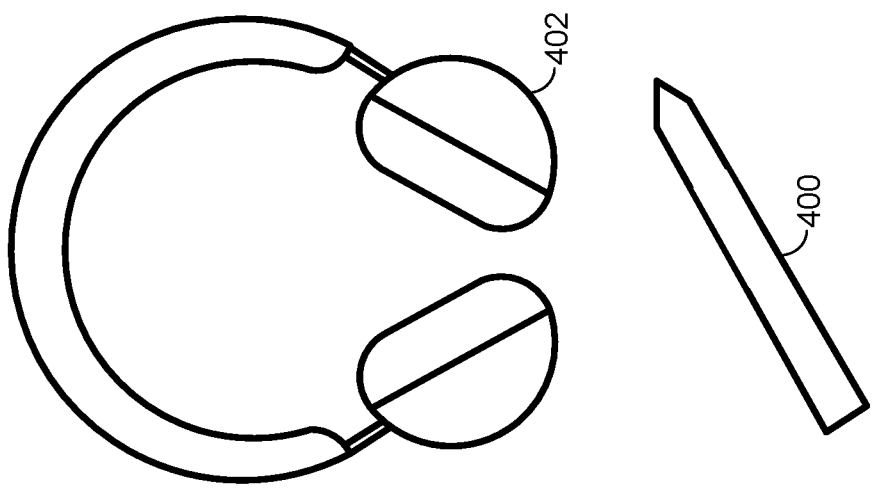
Figure 4B:
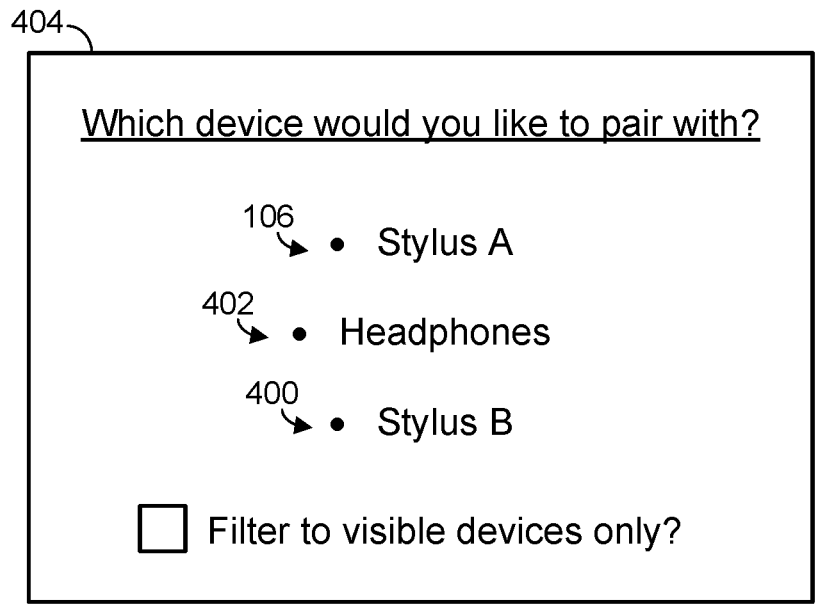
Figure 4C:
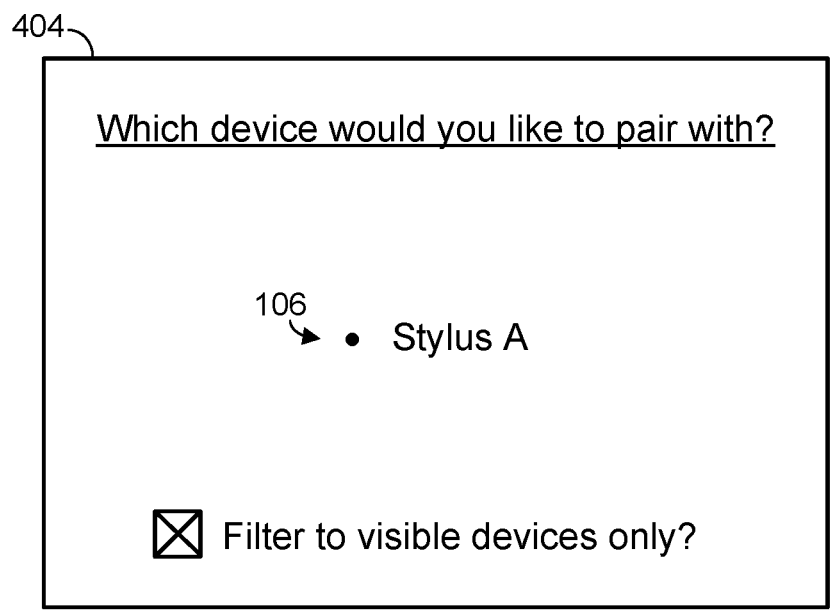

This is schematically illustrated with respect to FIG. 4B, showing an example list 404 of electronic accessories detected by host computing device 100. For instance, in some examples, list 404 is displayed by the host computing device to a human user—e.g., in response to user input to pair the host computing device with a new electronic accessory. It will be understood that the specific appearance of list 404 is non-limiting, and that such information may be presented in any suitable way.

In the example of FIG. 4B, stylus 106 is prioritized higher in list 404 than headphones 402 and stylus 400. This is because stylus 106 is imaged by camera 110, while headphones 402 and stylus 400 are detected via one or more other accessory detection modalities of the host computing device—e.g., via detection of RF signals, detection of an audio output signal, or detection of electrostatic changes at touch electrodes of a touch-sensitive display. As such, it may be relatively more likely that stylus 106 is the electronic accessory that the user intends to pair with the host computing device due to its relatively close proximity. By prioritizing stylus 106 higher in list 404 than the non-imaged electronic accessories, the system reduces the risk that the user will inadvertently attempt to pair with the incorrect accessory. In this manner, prioritizing imaged electronic accessories over non-imaged accessories in a pairing list provides the technical benefit of improving human computer interaction.

In some examples, to further emphasize any electronic accessories imaged by the camera, the computing device filters the list to only include electronic accessories detected in the image of the external environment. This scenario is schematically illustrated with respect to FIG. 4C, in which a user has selected an option to filter list 404 to only visible electronic accessories—e.g., those detected in an image captured by camera 110. As such, stylus 106 is still represented in list 404, while headphones 402 and stylus 400 are hidden. It will be understood that, in various examples, such list filtering is triggered at any suitable time and in response to any suitable user input or automatic condition. Furthermore, in some examples, the list is filtered by default to only include imaged electronic accessories, with the ability to reveal non-imaged electronic accessories in response to user input.

Regardless of whether the list is filtered, the host computing device in some cases attempts to establish an electronic pairing with any of the electronic accessories selected by the user. For instance, in some examples, the pairing between the host computing device and the imaged electronic accessory is established based at least in part on user selection of the imaged electronic accessory from the list of two or more detected electronic accessories. Furthermore, in some examples, the host computing device displays an indication of a potentially incorrect pairing in response to receiving a request to pair with a different electronic accessory not detected in the image of the external environment.

As such, returning briefly to FIG. 2, at 212 method 200 optionally includes displaying an indication of a potentially incorrect pairing in response to a request to pair with a non-imaged electronic accessory. By contrast, in a case where the imaged electronic accessory is selected, then at 214, method 200 includes establishing a pairing between the host computing device and the imaged electronic accessory based at least in part on the image of the external environment. It will be understood that, as used herein, "establishing a pairing" can refer to establishing a loose coupling, and need not refer specifically to a full RF pairing via Bluetooth® or other suitable standard. Rather, "establishing a pairing" is generally used to mean that the accessory and computing device being exchanging data relating to use of the accessory.

Figure 4D:
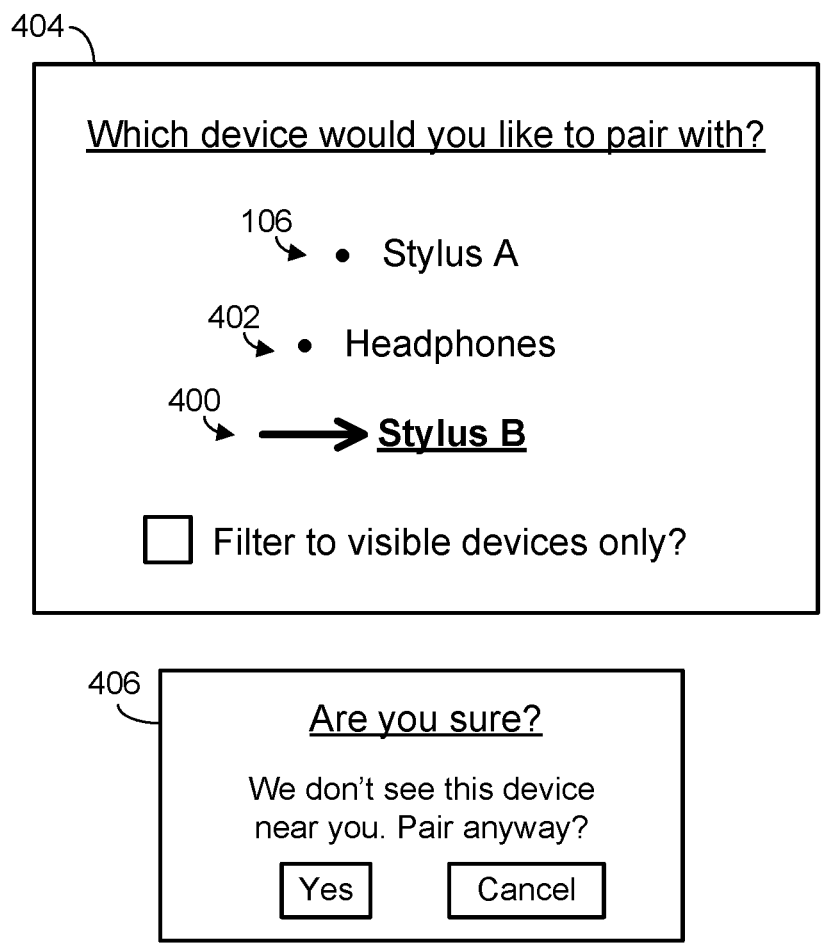
Figure 4E:
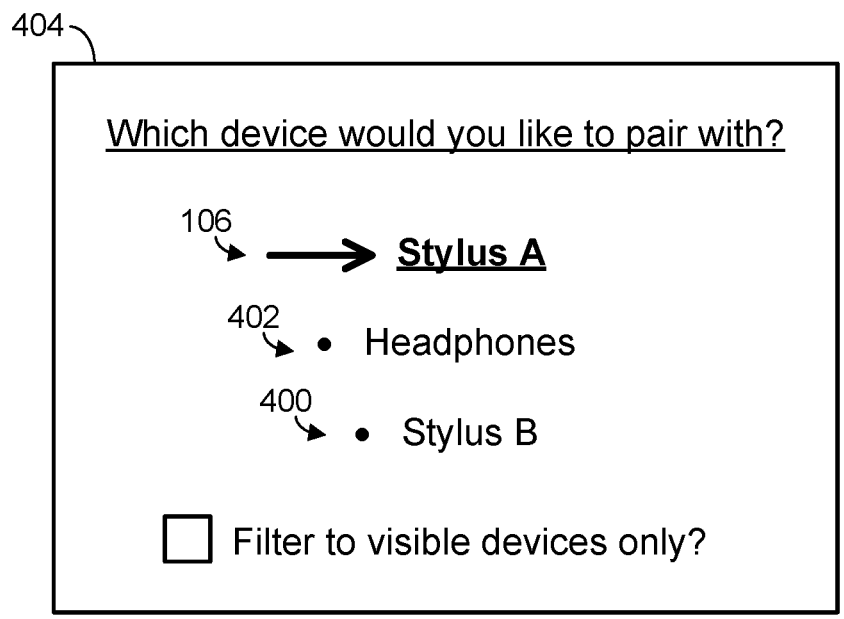
Figure 4E:
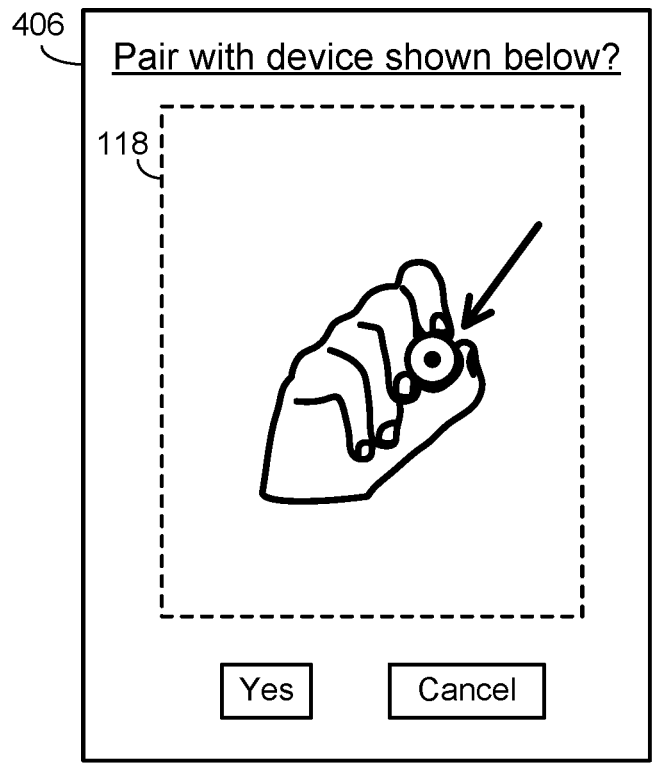

FIG. 4D schematically illustrates a scenario where an indication of a potentially incorrect pairing is displayed. Specifically, a user has selected stylus 400 from list 404, as indicated by its visual emphasis in FIG. 4D. However, as is shown in FIG. 4A, stylus 400 is not detectable in images captured by camera 110 of the host computing device (due to being outside the FOV 112 of camera 110). As such, in some cases, it may be relatively less likely that the user intends to pair with stylus 400 and not stylus 106. To potentially prevent the user from committing to a lengthy and unsuccessful pairing attempt with the incorrect accessory, the host computing device displays an indication 406 of a potentially incorrect pairing. This enables the user to confirm that they indeed selected the correct accessory, or alternatively cancel their selection.

Additionally, or alternatively, greater pairing accuracy can be achieved by displaying a pairing confirmation prompt that includes the image of the external environment. This is schematically illustrated with respect to FIG. 4E, again showing list 404 of detected electronic accessories. In this example, the user has selected stylus 106 for pairing. As such, the host computing device displays a pairing confirmation prompt 406 that includes image 118, captured by camera 110 of the host computing device. This beneficially enables the user to visually confirm that they are attempting to pair with their intended accessory, before committing to a potentially lengthy pairing process with an incorrect accessory. As such, including an image with a confirmation prompt provides the technical benefit of improving human-computer interaction.

Additionally, or alternatively, pairing with an imaged electronic accessory in some examples includes detecting, from the image of the external environment, that the imaged electronic accessory is in a use-ready context. As discussed above, this generally involves detecting contextual details in or around the detected electronic accessory that pertain to the likelihood that the accessory is intended for use in the near future. Because different types of electronic accessories are used in different ways (e.g., a stylus is held in the hand and used for writing, while earbuds are worn in the ears), the specific contextual details used for inferring an accessory's use-ready context depend on the implementation. This provides a technical benefit by improving human computer interaction and reducing consumption of computing resources, as it reduces the risk that the computing device will attempt to pair with an accessory that is not intended for use.

For instance, in one example, the imaged electronic accessory is an active stylus, and the use-ready context occurs when the active stylus is held in a hand of a human user. In other words, presence of the stylus in a human hand is a contextual detail indicative of the user's intent to use the stylus with the host computing device. This is the case for stylus 106 as captured in image 118, described above with respect to FIG. 1B, where the stylus is held by human hand 108.

Whether a stylus is held in a human hand, or whether any other electronic accessory is in a use-ready context, is detectable by the host computing device in any suitable way. As one example, either or both of the accessory detection controller and logic subsystem analyze the images of the external environment via a previously-trained machine learning model, where the model is trained to detect contextual details regarding an accessory's use readiness. For example, in the case of a stylus, the previously-trained machine learning model may be trained to distinguish styluses held in a human hand from styluses not held in a human hand (e.g., resting on a surface, stowed in a case, charging), using a set of labelled training images depicting both scenarios. Non-limiting examples of suitable ML and/or AI techniques will be described below with respect to FIG. 7.

As discussed above, the contextual details used for inferring an accessory's use-ready context will vary depending on the specific type of accessory in question. Thus, it will be understood that the above example of a stylus held in a human hand is non-limiting. As another non-limiting example, the imaged electronic accessory is a wearable audio output device (e.g., headphones, earbuds), and the use-ready context occurs when the wearable audio output device is positioned proximate to a human user. In other words, the use-ready context occurs when the audio output device is positioned for listening, and not when it is, for example, stowed in a case or plugged in for charging.

Additionally, or alternatively, an accessory's use ready context is determined, in some examples, based at least in part on an estimated distance between the accessory and the camera. For instance, if a stylus detected in an image is estimated to be within one meter of the camera, it is possible that the imaged stylus is intended for pairing by a user. However, if the stylus is estimated to be over three meters away from the camera, it is relatively less likely that the user intends to pair with the stylus, given its significant distance away from the host computing device. As such, in some examples, the use-ready context occurs when the imaged electronic accessory is estimated to have a distance away from the camera that is less than a pairing threshold distance.

As discussed above, this provides a technical benefit by reducing the risk that the computing device will attempt to pair with an accessory that is not intended for use—e.g., as it is located relatively far from the computing device.

In various examples, the distance between the camera and the electronic accessory is estimated in any suitable way. As one example, the distance is estimated based at least in part on the apparent size of the detected electronic accessory relative to the pixel resolution of the camera. For instance, some number of pixels of the image are classified as corresponding to the detected electronic accessory. Based on the known pixel resolution of the camera, and a known size of the accessory (e.g., a particular model of stylus is known to have a length of 14 cm), the host computing device can approximate the distance between the camera and the accessory based on the size of the pixel cluster classified as corresponding to the accessory.

In other examples, however, the distance between the accessory and the host computing device is estimated in another suitable way. In some examples, the host computing device is communicatively coupled to two or more cameras arranged as a stereoscopic array, which are useable to estimate the distance between the host computing device and the accessory based on the position of the accessory in the two or more captured images, and known properties of the stereoscopic cameras. Additionally, or alternatively, the host computing device is communicatively coupled with a suitable depth camera (e.g., a time-of-flight or structured light depth camera), configured to output estimated depth values for imaged objects in the environment.

As discussed above, in addition to or instead of improving accessory pairing in environments where multiple potential accessories are present, the techniques described herein can improve the accuracy of a "loose coupling" pairing process. Lose coupling typically involves the computing device and accessory transmitting and/or receiving some amount of data via a communications modality that is different from, and often shorter-range than, the RF communications channel used for full pairing (e.g., Bluetooth®). This can save time and enable at least partial functionality of the electronic accessory without performing a full pairing process, which often takes longer and requires interaction with a physical pairing mechanism on the accessory.

Use of the techniques described herein can beneficially improve pairing in situations where environmental factors interfere with the loose coupling process. For example, cases where a human hand touching a touch-sensitive display interferes with reception of a drive signal emitted by a nearby stylus, or cases where background noise interferes with detection of an audio pairing signal output by an audio accessory. Thus, in some examples, the camera is a first accessory detection modality, while the host computing device detects one or more accessory presence parameters via a second accessory detection modality (e.g., capacitive touch sensor, microphone). The second accessory detection modality is sometimes referred to herein as a "non-visual" accessory detection modality, as it typically does not rely on detection of the accessory via a visible-light camera.

In some examples, the accessory presence parameters are detected via the second accessory detection modality before capturing the image of the external environment. Furthermore, as discussed above, the image of the external environment is in some cases captured in response to detecting the accessory presence parameters—e.g., in examples where the camera does not operate in an "always on" mode. In other examples, any or all of the accessory presence parameters are detected after the image of the external environment is captured. In general, detection of accessory presence parameters provides a technical benefit of improving human-computer interaction by improving the speed and consistency with which the computer is able to pair with electronic accessories.

The one or more accessory presence parameters take any suitable form and will vary depending on the implementation, as different types of electronic accessories are detectable in different ways. In some examples, the electronic accessory is an active stylus including a stylus electrode driven with a drive signal to affect electrostatic conditions proximate to the stylus electrode. In such examples, the second accessory detection modality includes a plurality of touch-sensitive electrodes of the host computing device detecting changes in local electrostatic conditions caused by proximity of the stylus electrode. Thus, the accessory presence parameters include local electrical conditions detected by the touch-sensitive electrodes—e.g., changes in capacitance caused by presence of the stylus.

Figure 5A:
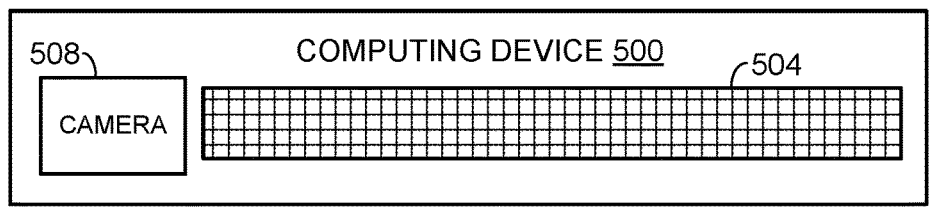
FIGS. 5A and 5B schematically illustrate pairing an electronic accessory based at least in part on accessory detection parameters from a second pairing modality.
Figure 5A:
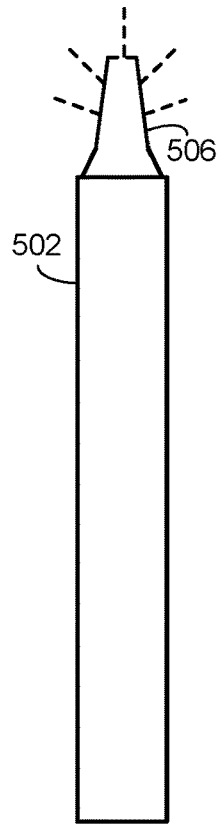
Figure 5B:
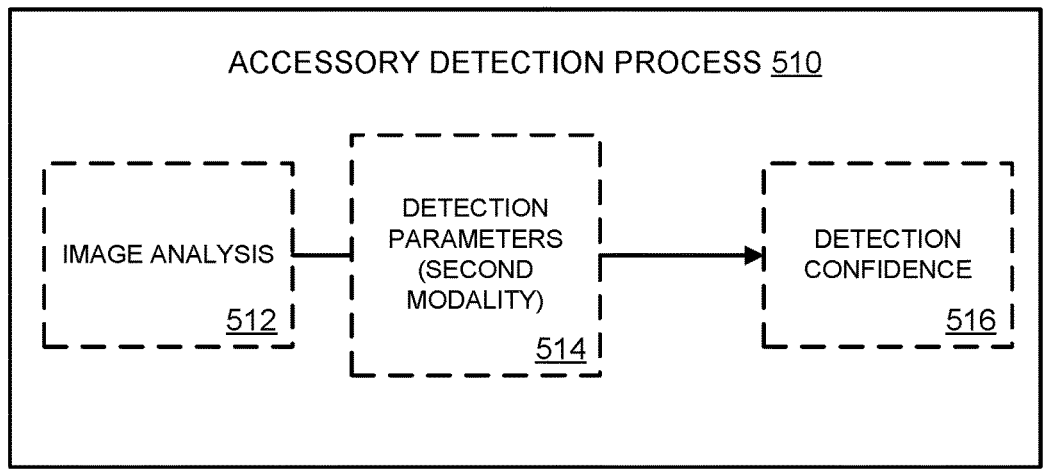

This scenario is schematically illustrated with respect to FIGS. 5A and 5B. Specifically, FIG. 5A schematically shows an example computing device 500 interacting with a separate electronic accessory 502, taking the form of an active stylus. As shown, computing device 500 includes a plurality of touch-sensitive electrodes 504, implemented as part of a touch-sensitive display or other suitable touch-sensitive input device. Stylus 502 includes a stylus electrode 506, driven with a drive signal to influence local electrostatic conditions, as indicated by the dashed lines extending away from the stylus electrode. These changes in electrostatic conditions are detectable at the touch-sensitive electrodes—e.g., as accessory presence parameters.

During a loose coupling between the stylus and computing device, either or both of the stylus electrode and touch-sensitive electrodes of the computing device may be driven with encoded drive signals to transmit data. This enables the host computing device to receive data from the stylus electrostatically, such as unique identifiers or user preferences, and/or transmit data to the stylus by driving electrodes of the touch-sensitive display with encoded drive signals detectable by the stylus. In this manner, at least partial functionality of the active stylus may be implemented without waiting for a lengthy RF pairing process to complete, and without requiring the user to interact with a physical pairing mechanism on the stylus (such as a pairing button).

However, as discussed above, some environmental conditions can interfere with the loose coupling process. As one example, contact between a human hand and the touch-sensitive electrodes can interfere with detection of the drive signal emitted by the stylus. As a result, the signal-to-noise ratio of the drive signal detected at the touch-sensitive electrodes is too weak to confidently confirm presence of the stylus. In other words, the host computing device uses an accessory detection process to output a detection confidence value based at least in part on the accessory presence parameters. Contact between the human hand and touch electrodes (or other suitable source of signal interference) causes the detection confidence value output by the accessory detection process to be below a positive detection threshold, and the host computing device is unable to detect presence of the stylus.

As such, in FIG. 5A, host computing device 500 additionally includes a camera 508 configured to image the external environment. An image captured by camera 508 depicts stylus 502, as described above. In some cases, the accessory detection process is weighted toward detection of the imaged electronic accessory based at least in part on the image of the external environment. For instance, as described above, an accessory detection controller of the host computing device in some cases analyzes the captured image to output a confidence of detection of an electronic accessory in the image. This detection confidence can be used as a weighting factor in the accessory detection process—e.g., a relatively high confidence of detection in the captured image leads to a high confidence of detection overall, even when presence is not otherwise indicated by the accessory presence parameters.

This is schematically illustrated with respect to FIG. 5B, showing an example accessory detection process 510. In some examples, process 510 is useable by the computing device to output a determination as to whether an electronic accessory is present, and therefore whether loose coupling with the accessory should be initiated. In this example, the accessory detection process considers the result of both an image analysis 512 (e.g., a confidence value output by the accessory detection controller), and one or more accessory presence parameters 514 output by the second accessory detection modality (e.g., touch electrodes, detection of audio signal). Based on a weighted consideration of at least these two factors, the process outputs an overall detection confidence value 516. In some examples, the detection confidence value is compared to a suitable predefined positive detection threshold to output a final determination as to whether the accessory is present.

It will be understood that process 510 is non-limiting and highly simplified for the sake of explanation. Depending on the specific capabilities of the host computing device, the specific type of electronic accessories to be detected, and the desired balance between false positives/false negatives, any suitable factors may be considered, such factors may be weighted in any suitable way relative to one another, and any suitable positive detection threshold may be used.

As discussed above, loose coupling can in some cases be used in scenarios other than a stylus interacting with a host computing device electrostatically. For instance, in some examples, the electronic accessory is an audio output device configured to output an audio pairing signal. In such examples, the second accessory detection modality includes detecting the audio pairing signal at a microphone communicatively coupled to the host computing device. In such cases, the accessory presence parameters include signals measured by the microphone—e.g., sound waveforms detected in the environment.

Figure 6:
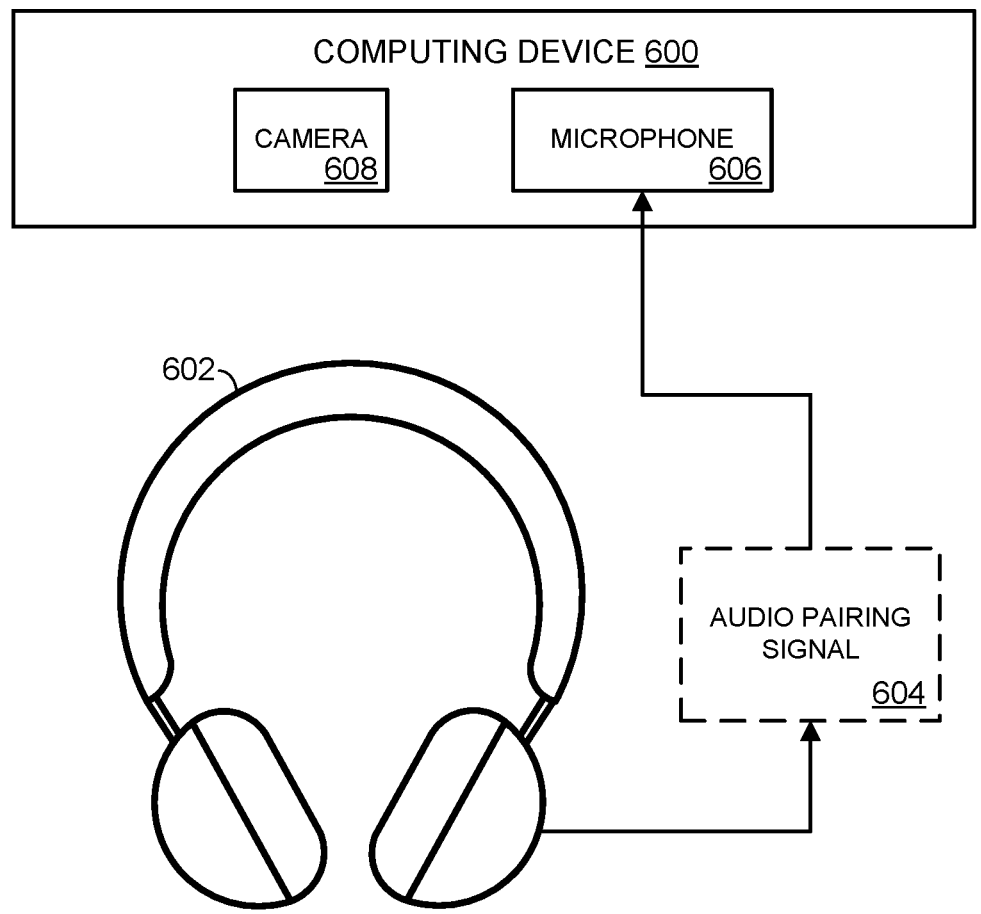
FIG. 6 schematically illustrates pairing another example electronic accessory based at least in part on accessory detection parameters from a second accessory detection modality.

This scenario is schematically illustrated with respect to FIG. 6, showing an example computing device 600 and separate electronic accessory 602. In this example, the separate electronic accessory takes the form of an audio output device, and outputs an audio pairing signal 604. The audio pairing signal takes any suitable form, and generally conveys some information regarding the accessory (e.g., its unique identifier, capabilities, user preferences information) as an encoded audio waveform. In some examples, it is desirable for the audio pairing signal to use frequencies that are inaudible to the human ear—e.g., ultrasonic frequencies. By detecting the audio pairing signal at a microphone 606, the computing device can detect presence of the accessory and initiate a loose coupling—e.g., by emitting its own audio pairing signal, or transmitting data to accessory 602 over another suitable communications modality.

However, as discussed above, environmental conditions (such as significant background noise) can interfere with detection of the audio pairing signal at the computing device. As such, computing device 600 additionally uses a camera 608 to image the external environment and detect accessory 602. This can be used to beneficially increase the accuracy and consistency of the loose coupling process as described above with respect to FIGS. 5A and 5B.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
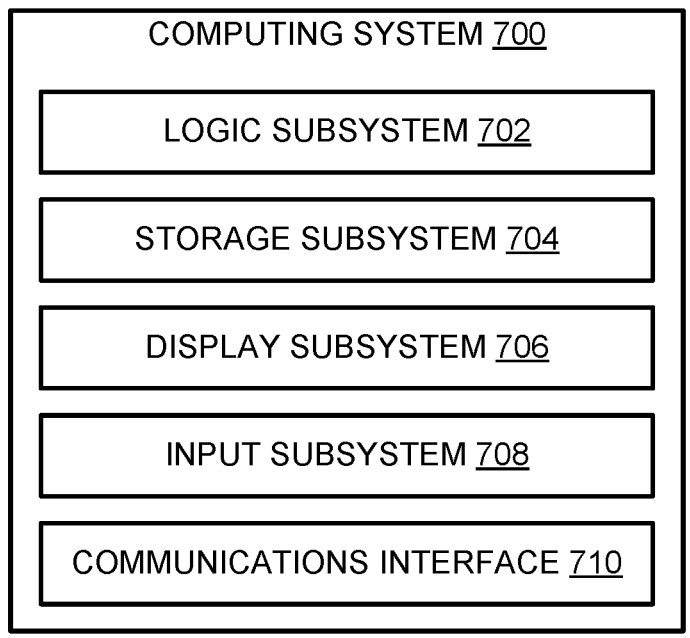
FIG. 7 schematically shows an example computing system.

FIG. 7 schematically shows a simplified representation of a computing system 700 configured to provide any to all of the compute functionality described herein. Computing system 700 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 700 includes a logic subsystem 702 and a storage subsystem 704. Computing system 700 may optionally include a display subsystem 706, input subsystem 708, communication subsystem 710, and/or other subsystems not shown in FIG. 7.

Logic subsystem 702 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 704 includes one or more physical devices configured to temporarily and/or permanently hold computer information such as data and instructions executable by the logic subsystem. When the storage subsystem includes two or more devices, the devices may be collocated and/or remotely located. Storage subsystem 704 may include volatile, nonvolatile, dynamic, static, read/write, read-only, random-access, sequential-access, location-addressable, file-addressable, and/or content-addressable devices. Storage subsystem 704 may include removable and/or built-in devices. When the logic subsystem executes instructions, the state of storage subsystem 704 may be transformed—e.g., to hold different data.

Aspects of logic subsystem 702 and storage subsystem 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 706 may be used to present a visual representation of data held by storage subsystem 704. This visual representation may take the form of a graphical user interface (GUI). Display subsystem 706 may include one or more display devices utilizing virtually any type of technology. In some implementations, display subsystem may include one or more virtual-, augmented-, or mixed reality displays.

When included, input subsystem 708 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data may only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible, anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for electronic accessory pairing comprises: capturing an image of an external environment via a camera communicatively coupled to a host computing device; analyzing the image of the external environment to detect presence of an imaged electronic accessory; determining that the host computing device is not presently paired with the imaged electronic accessory; and establishing a pairing between the host computing device and the imaged electronic accessory. In this example or any other example, the method further comprises, prior to establishing the pairing, displaying a list of two or more detected electronic accessories for pairing, including one or more non-imaged electronic accessories detected via a second accessory detection modality of the host computing device and not detected in the image of the external environment, and prioritizing the imaged electronic accessory higher in the list than the one or more non-imaged electronic accessories. In this example or any other example, the pairing between the host computing device and the imaged electronic accessory is established based at least in part on user selection of the imaged electronic accessory from the list of two or more detected electronic accessories. In this example or any other example, the method further comprises, in response to user input, filtering the list to only include electronic accessories detected in the image of the external environment. In this example or any other example, the method further comprises, in response to receiving a request to pair with a second electronic accessory not detected in the image of the external environment, displaying an indication of a potentially incorrect pairing. In this example or any other example, the method further comprises, prior to establishing the pairing, displaying a pairing confirmation prompt that includes the image of the external environment. In this example or any other example, the pairing between the host computing device and the imaged electronic accessory is established based at least in part on detecting, from the image of the external environment, that the imaged electronic accessory is in a use-ready context. In this example or any other example, the imaged electronic accessory is an active stylus, and the use-ready context occurs when the active stylus is held in a hand of a human user. In this example or any other example, the imaged electronic accessory is a wearable audio output device, and the use-ready context occurs when the wearable audio output device is positioned proximate to a human ear. In this example or any other example, the use-ready context occurs when the imaged electronic accessory is estimated to have a distance away from the camera that is less than a pairing threshold distance. In this example or any other example, the camera is a first accessory detection modality, and the method further comprises, prior to establishing the pairing, detecting one or more accessory presence parameters via a second accessory detection modality, the one or more accessory presence parameters used as inputs in an accessory detection process that outputs a detection confidence value. In this example or any other example, the detection confidence value output by the accessory detection process falls below a positive detection threshold, and the accessory detection process is weighted toward detection of the imaged electronic accessory based at least in part on the image of the external environment. In this example or any other example, the electronic accessory is an active stylus including a stylus electrode driven with a drive signal to affect electrostatic conditions proximate to the stylus electrode, and the second accessory detection modality includes a plurality of touch-sensitive electrodes of the host computing device detecting changes in local electrostatic conditions caused by proximity of the stylus electrode. In this example or any other example, the electronic accessory is an audio output device configured to output an audio pairing signal, and the second accessory detection modality includes detecting the audio pairing signal at a microphone communicatively coupled to the host computing device. In this example or any other example, the camera is on by default and used to capture a plurality of images of the external environment while the host computing device is in an active state. In this example or any other example, the plurality of images of the external environment are processed by an accessory detection controller, and the accessory detection controller analyzes the image of the external environment to detect presence of the imaged electronic accessory, and outputs an indication of detection of the imaged electronic accessory to a separate logic subsystem of the host computing device.

In an example, a host computing device comprises: a logic subsystem; and a storage subsystem holding instructions executable by the logic subsystem to: capture an image of an external environment via a camera communicatively coupled to the host computing device; analyze the image of the external environment to detect presence of an imaged electronic accessory; via a second accessory detection modality of the host computing system, detect presence of two or more detected electronic accessories, including the imaged electronic accessory detected in the image of the external environment, and a non-imaged electronic accessory not detected in the image of the external environment; and display a list of the two or more detected electronic accessories such that the imaged electronic accessory is prioritized higher in the list than the non-imaged electronic accessory. In this example or any other example, the instructions are further executable to, in response to receiving a request to pair with the non-imaged electronic accessory, display an indication of a potentially incorrect pairing.

In an example, a host computing device comprises: a logic subsystem; and a storage subsystem holding instructions executable by the logic subsystem to: via a non-visual accessory detection modality of the host computing device, detect one or more accessory presence parameters indicative of presence of a potential electronic accessory; via an accessory detection process and using the one or more accessory presence parameters as inputs, output a detection confidence value for the potential electronic accessory, the detection confidence value falling below a positive detection threshold; capture an image of an external environment via a camera communicatively coupled to the host computing device; analyze the image of the external environment to detect presence of an imaged electronic accessory consistent with the potential electronic accessory; and establish a loose coupling between the host computing device and the imaged electronic accessory based at least in part on the image of the external environment and the one or more accessory presence parameters. In this example or any other example, the imaged electronic accessory is an active stylus including a stylus electrode driven with a drive signal to affect electrostatic conditions proximate to the stylus electrode, and wherein the non-visual accessory detection modality includes a plurality of touch-sensitive electrodes of the host computing device detecting changes in local electrostatic conditions caused by proximity of the imaged stylus electrode.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for electronic accessory pairing, the method comprising:
   capturing an image of an external environment via a camera communicatively coupled to a host computing device;
   analyzing the image of the external environment to detect presence of an imaged electronic accessory;
   determining that the host computing device is not presently paired with the imaged electronic accessory;
   displaying a pairing confirmation prompt that includes the image of the external environment; and
   establishing a pairing between the host computing device and the imaged electronic accessory.

2. The method of claim 1, further comprising, prior to establishing the pairing, displaying a list of two or more detected electronic accessories for pairing, including one or more non-imaged electronic accessories detected via a second accessory detection modality of the host computing device and not detected in the image of the external environment, and prioritizing the imaged electronic accessory higher in the list than the one or more non-imaged electronic accessories.

3. The method of claim 2, wherein the pairing between the host computing device and the imaged electronic accessory is established based at least in part on user selection of the imaged electronic accessory from the list of two or more detected electronic accessories.

4. The method of claim 2, further comprising, in response to user input, filtering the list to only include electronic accessories detected in the image of the external environment.

5. The method of claim 1, further comprising, in response to receiving a request to pair with a second electronic accessory not detected in the image of the external environment, displaying an indication of a potentially incorrect pairing.

6. The method of claim 1, wherein the pairing between the host computing device and the imaged electronic accessory is established based at least in part on detecting, from the image of the external environment, that the imaged electronic accessory is in a use-ready context.

7. The method of claim 6, wherein the imaged electronic accessory is an active stylus, and the use-ready context occurs when the active stylus is held in a hand of a human user.

8. The method of claim 6, wherein the imaged electronic accessory is a wearable audio output device, and the use-ready context occurs when the wearable audio output device is positioned proximate to a human ear.

9. The method of claim 6, wherein the use-ready context occurs when the imaged electronic accessory is estimated to have a distance away from the camera that is less than a pairing threshold distance.

10. The method of claim 1, wherein the camera is a first accessory detection modality, and the method further comprises, prior to establishing the pairing, detecting one or more accessory presence parameters via a second accessory detection modality, the one or more accessory presence parameters used as inputs in an accessory detection process that outputs a detection confidence value.

11. The method of claim 10, wherein the detection confidence value output by the accessory detection process falls below a positive detection threshold, and wherein the accessory detection process is weighted toward detection of the imaged electronic accessory based at least in part on the image of the external environment.

12. The method of claim 10, wherein the electronic accessory is an active stylus including a stylus electrode driven with a drive signal to affect electrostatic conditions proximate to the stylus electrode, and wherein the second accessory detection modality includes a plurality of touch-sensitive electrodes of the host computing device detecting changes in local electrostatic conditions caused by proximity of the stylus electrode.

13. The method of claim 10, wherein the electronic accessory is an audio output device configured to output an audio pairing signal, and wherein the second accessory detection modality includes detecting the audio pairing signal at a microphone communicatively coupled to the host computing device.

14. The method of claim 1, wherein the camera is on by default and used to capture a plurality of images of the external environment while the host computing device is in an active state.

15. The method of claim 14, wherein the plurality of images of the external environment are processed by an accessory detection controller, and wherein the accessory detection controller analyzes the image of the external environment to detect presence of the imaged electronic accessory, and outputs an indication of detection of the imaged electronic accessory to a separate logic subsystem of the host computing device.

16. A host computing device, comprising:
   a logic subsystem; and
   a storage subsystem holding instructions executable to:
      capture an image of an external environment via a camera communicatively coupled to the host computing device;
      analyze the image of the external environment to detect presence of an imaged electronic accessory;
      via a second accessory detection modality of the host computing system, detect presence of two or more detected electronic accessories, including the imaged electronic accessory detected in the image of the external environment, and a non-imaged electronic accessory not detected in the image of the external environment; and display a list of the two or more detected electronic accessories such that the imaged electronic accessory is prioritized higher in the list than the non-imaged electronic accessory.

17. The host computing device of claim 16, wherein the instructions are further executable to, in response to receiving a request to pair with the non-imaged electronic accessory, display an indication of a potentially incorrect pairing.

18. A host computing device, comprising:
a logic subsystem; and
a storage subsystem holding instructions executable to:
via a non-visual accessory detection modality of the host computing device, detect one or more accessory presence parameters indicative of presence of a potential electronic accessory;
via an accessory detection process and using the one or more accessory presence parameters as inputs, output a detection confidence value for the potential electronic accessory, the detection confidence value falling below a positive detection threshold;
capture an image of an external environment via a camera communicatively coupled to the host computing device;
analyze the image of the external environment to detect presence of an imaged electronic accessory consistent with the potential electronic accessory; and
establish a loose coupling between the host computing device and the imaged electronic accessory based at least in part on the image of the external environment and the one or more accessory presence parameters.

19. The host computing device of claim 18, wherein the imaged electronic accessory is an active stylus including a stylus electrode driven with a drive signal to affect electrostatic conditions proximate to the stylus electrode, and wherein the non-visual accessory detection modality includes a plurality of touch-sensitive electrodes of the host computing device detecting changes in local electrostatic conditions caused by proximity of the imaged stylus electrode.

* * * * *